United States Patent [19]

Cheh

[11] 4,364,835

[45] Dec. 21, 1982

[54] SULFITE DESTRUCTION OF DIRECT ACTING MUTAGENS IN DRINKING WATER

[75] Inventor: Albert M. Cheh, Silver Spring, Md.

[73] Assignee: Regents of the University of Minnesota, Minneapolis, Minn.

[21] Appl. No.: 200,376

[22] Filed: Oct. 24, 1980

[51] Int. Cl.³ .......................... C02F 1/70; C02F 1/76
[52] U.S. Cl. .................................. 210/752; 210/755; 210/757; 210/908
[58] Field of Search .................. 210/753-758, 210/764, 752, 908; 424/162; 422/28; 423/539, 542, 543, 166

[56] References Cited

U.S. PATENT DOCUMENTS

| | | | |
|---|---|---|---|
| 1,229,305 | 6/1917 | Menzies | 210/758 |
| 2,134,679 | 11/1938 | Allen | 424/162 |
| 4,282,104 | 8/1981 | Pacini et al. | 210/754 |
| 4,304,673 | 12/1981 | Reynolds et al. | 210/764 |

FOREIGN PATENT DOCUMENTS

| | | | |
|---|---|---|---|
| 54-105844 | 8/1979 | Japan | 210/757 |
| 1457203 | 12/1976 | United Kingdom | 210/756 |

OTHER PUBLICATIONS

Cheh, A. M. et al., "Nonvolatile Mutagens in Drinking Water: Production by Chlorination and Destruction by Sulfite", Science, vol. 207, pp. 90-92, (1980).

Proceedings of the Third Conference on Water Chlorination: Environmental Impact & Health Effects; Colorado Springs, Colorado, Oct. 28-Nov. 2, 1979, pp. 804, 805, 812.

Chemical & Engineering News, p. 24, Jan. 24, 1980.

Abstract of Proceedings of the 3rd Conf. on Water Chlorination, Distributed in Colorado Springs, Colorado, Oct. 28, 1979.

*Primary Examiner*—Benoit Castel
*Attorney, Agent, or Firm*—Burd, Bartz & Gutenkauf

[57] ABSTRACT

A method of reducing the activity of non-volatile mutagens, in chlorinated water, such as chlorinated drinking water and municipal and industrial waste water, by sulfite treatment. The chlorinated water is treated with a stoichiometric excess of sulfur dioxide or soluble sulfite or bisulfite salt sufficient to dechlorinate the water and at least partially destroy the mutagens present.

17 Claims, No Drawings

SULFITE DESTRUCTION OF DIRECT ACTING MUTAGENS IN DRINKING WATER

FIELD OF THE INVENTION

BACKGROUND OF THE INVENTION

This invention is directed to a method of reducing the level of non-volatile mutagens in chlorinated water by sulfite treatment. Water to be used for drinking is commonly purified by chlorination to destroy any harmful microorganisms which may be present. It has been shown that non-volatile direct acting mutagens (not requiring enzymatic activation) are generated by the water treatment process of chlorination. There is concern that some of the mutagens produced may be carcinogenic. Although alternative water treatment methods are known, such as ozonation, which may or may not produce mutagens, the vast majority of water treating facilities are adapted to use chlorination. It has been discovered that treatment of chlorinated water with sulfite reduces mutagen levels significantly.

THE PRIOR ART

Sulfite treatment of water is known, especially as treatment with sulfur dioxide. Such treatment has been practiced to partially dechlorinate water subjected to excess chlorination to reduce the chlorine to acceptable palatable levels. For example, in some water treatment systems it is necessary to disinfect rapidly by the introduction of excess chlorine, and then to partially dechlorinate with sulfur dioxide, while retaining sufficient chlorine to prevent later bacterial contamination. In some cases, such as waste water discharge to the environment, where the presence of chlorine is undesirable, complete dechlorination with a stoichiometric amount of sulfur dioxide may be undertaken.

SUMMARY OF THE INVENTION

The present invention is directed to the method of reducing the activity of non-volatile mutagens in chlorinated water by sulfite treatment. The method comprises the steps of first determining the residual chlorine content in the water, adding sulfite to the water in amount in excess of that needed to eliminate the residual chlorine and uniformly and thoroughly admixing the sulfite and water to dechlorinate the water by eliminating the residual chlorine and reacting with the mutagenic organic compounds to at least partially destroy the mutagens.

DETAILED DESCRIPTION OF THE PREFERRED EMBODIMENT

According to the present invention, direct acting mutagens in chlorinated water are destroyed by sulfite treatment. The sulfite treatment is applicable to drinking water produced by municipal and private water treatment plants and to chlorinated municipal and industrial waste waters. The treatment is carried out by first determining the residual chlorine content of the water and then introducing sulfite in an amount in excess of that which is necessary to eliminate the residual chlorine. The sulfite may be introduced in the form of a soluble metallic sulfite or bisulfite salt such as an alkaline metal sulfite or bisulfite, preferably sodium or potassium. However, for convenience, sulfite is preferably introduced into the water in the form of gaseous sulfur dioxide since partial dechlorination of drinking water with $SO_2$ is an established treatment procedure.

The extent to which sulfite destroys direct acting mutagens will depend on the chemical rates of reaction. Thus higher concentrations of sulfite would destroy mutagens more rapidly. The upper limit to sulfite concentration would depend on balancing the increased cost of adding greater amounts of sulfite against diminishing returns of mutagen destruction. The lower limit for sulfite concentration is determined by the requirement that there be enough sulfite to first destroy the residual chlorine and then destroy the mutagens. Thus, sulfite is usually introduced into the water in amounts at least 1.2 times to 10 times the stoichiometric ratio of sulfite to chlorine, usually not exceeding about $2 \times 10^{-4}$ moles of sulfite per liter.

The Ames Salmonella plate test (Ames et al, *Mutat. Res.* 31, p. 347, 1975) is used to detect low levels of direct acting mutagens and promutagens in water. The mutagens alter the genetic composition of the Salmonella, permitting the mutagen content of the water to be assayed. Chlorinated waste waters will often contain enough mutagenic activity to allow their direct testing in the Ames test. Chlorinated drinking water will usually contain far lower levels of mutagenic organics, necessitating concentration by methods such as XAD adsorption, reverse osmosis or solvent extraction and evaporation prior to testing in the Ames test.

The time of sulfite treatment is not critical. Dependent primarily upon the water treatment facilities in which the dechlorination takes place, the time may vary between about 15 minutes to 6 hours or more. Dechlorination takes place at the ambient temperature of the water at the treatment plant, which may range from about 0° to 30° C., and at the normal pH of the water, which may range from about 5 to 12, usually about 7 to 9.

It is desirable that dechlorinated drinking water be rechlorinated to inhibit subsequent bacterial contamination. Rechlorination can use monochloramine to establish a $NH_2Cl$ residual of 2 to 4 ppm (as $Cl_2$). This establishes a persistent residual while limiting further mutagen production. Otherwise rechlorination can use free chlorine to establish residuals of about 0.1 ppm chlorine to 2 ppm. A key property of the invention is that mutagens are formed from precursors during initial chlorination; after mutagen destruction by sulfite, far lower levels of the precursors will exist for further mutagen production after rechlorination. Thus, regardless of whether chloramine or free chlorine is used in rechlorination, lower levels of mutagens will be found when sulfite treatment is used compared to when it is not.

The invention is further illustrated by the following examples:

EXAMPLES 1-6

Raw water from the upper Mississippi River that had been softened with lime was taken from a municipal treatment plant. The water was treated at the plant as follows: Lime was added to raise the pH and thus cause precipitation of calcium and magnesium. Alum was added simultaneously to facilitate sedimentation. Carbon dioxide was added to lower the pH. Powdered activated carbon was added to control taste and odor. At this stage, the water was withdrawn and subjected in the laboratory to treatment that would have been followed in the water treatment plant. All samples of 40 to 80 liters each were treated in a similar manner except that different procedures were used for chlorination and dechlorination. The water was chlorinated by the addition of chlorine water and coagulated with alum for 4 hours. The water was then filtered rapidly through a bed of sand and anthracite. The chlorination procedure is summarized in Table I.

TABLE I

| Example | Added $Cl_2$ (ppm) | Contact time (hour) | pH | Free residual (ppm) | Total residual (ppm) |
|---|---|---|---|---|---|
| 1 | 2.6 | 1.0 | 8.2 | 0.1 | 0.7 |
| 2 | 5.9 | 1.0 | 7.5 | 0.55 | 1.1 |
| 3 | 5.3 | 1.0 | 8.3 | 0.35 | 1.25 |
| 4 | 2.6 | 0.5 | 8.7 | 0.4 | 0.9 |
| 5 | 3.9 | 0.5 | 8.1 | 0.0 | 0.35 |
| 6 | 7.2 | 6.0 | 7.7 | 0.8 | 1.4 |

After the indicated contact time, the pH and chlorine residuals were measured. Two identical volumes of water were chlorinated in each instance. One of these samples was dechlorinated by the addition of 1.1 to 1.2 times the amount of $Na_2SO_3$ necessary to eliminate all residual chlorine. This was about three times the stoichiometric ratio of sulfite to chlorine. The chlorine in the volume that was not dechlorinated was converted to the far less reactive species monochloramine by the addition of a two-fold excess of ammonia over residual chlorine. This largely suppressed further mutagen production. After filtration, both samples were chloraminated to a chloramine residual of about 3 ppm. Table II gives the details for sulfite treatment.

TABLE II

| Example | Total residual chlorine (ppm) | Molar ratio sulfite/chlorine | Excess sulfite* | pH | Temperature | Contact time** |
|---|---|---|---|---|---|---|
| 1 | 0.7 | 3.5 | 1.75 | 8.2 | 6° C. | 3 hr |
| 2 | 1.1 | 3.7 | 3.0 | 7.5 | 8° C. | 4 hr |
| 3 | 1.25 | 3.3 | 2.9 | 8.3 | 12° C. | 4½ hr |
| 4 | 0.9 | 3.7 | 2.4 | 8.7 | 20° C. | 3½ hr |
| 5 | 0.35 | 2.8 | 0.6 | 8.1 | 25° C. | ½ hr |
| 6 | 1.4 | 0.7 | negative | 7.7 | 6° C. | 6 hr |

*as additional ppm of $Cl_2$ which could be destroyed by the excess sulfite
**time between sulfite addition and rechlorination Organic compounds present in the water were adsorbed to the non-polar resin Amberlite XAD-4 according to the method of Glatz et al (J. Am. Water Works Assoc., 70, p. 465, 1978). The organic compounds were desorbed by the use of acetone and then methylene chloride and the solvent and volatile organic compounds were removed by rotary evaporation of the samples to dryness. The residual organic compounds were dissolved in a volume of dimethylsulfoxide (DMSO) equal to about 1/20,000 that of the original water. Samples of the water concentrate were assayed by the Ames Salmonella plate test (supra). Several strains of Salmonella typhimurium were used for the test. The Ames test strain TA-100 showed the highest reversion rate with the water concentrates. The values for mutagen content using strain TA-100 are shown in Table III and represent slopes of linear dose response curves obtained by the plating in duplicate of at least five equally spaced doses of water concentrate corresponding to about 0.0 to 1.0 liter volumes prior to concentration. The 95 percent confidence intervals for the slopes and the number of plates in each case are indicated.

TABLE III

| | Mutagen content (revertants per liter) | | | | |
|---|---|---|---|---|---|
| Example | Sulfite Slope | treated N | Not sulfite Slope | treated N* | % |
| 1 | 753 ± 76 | 15 | 1291 ± 148 | 14 | 58 |
| 2 | 583 ± 118 | 18 | 1318 ± 209 | 18 | 44 |
| 3 | 333 ± 157 | 16 | 678 ± 82 | 18 | 49 |
| 4 | 65 ± 35 | 14 | 365 ± 38 | 18 | 18 |
| 5 | 360 ± 73 | 12 | 840 ± 67 | 12 | 43 |
| 6 | 1613 ± 280 | 16 | 1629 ± 168 | 15 | ~100 |

*N = number of plates.

The sulfite treated samples showed significantly lower mutagenic activity than those that were not sulfite treated. Example 6 represents water that was treated in the same manner as Examples 1-4 except the stoichiometric amount of sulfite added was less than that of chlorine. This would illustrate the prior art of partial dechlorination for palatability. No mutagen destruction occurs. Enough sulfite must be added to first destroy the chlorine; only then does the excess destroy the mutagens.

Examples 1-3 are a set of wintertime water samples, while Examples 4-5 are a set of summertime samples. Within each set the extent of mutagen destruction follows the amount of sulfite excess, as is predicted by the chemistry. In Table II the numbers in the column labeled "Excess sulfite" can be converted to millimoles/liter by multiplying by 0.0141. The range of excess sulfite, then, is $8.5 \times 10^{-6}$ to $4 \times 10^{-5}$ M. The amount of added sulfite in millimoles/liter may be obtained for each example by multiplying the number of Table II under the heading "Total residual chlorine" by the number under the heading "Molar ratio sulfite/chlorine" by 0.0141. Thus the amount of sulfite added in Examples 1-6 ranged from $1.4 \times 10^{-5}$ M to $5.8 \times 10^{-5}$ M.

The effect of temperature is also illustrated in Tables II and III by the comparison between 1-3 and 4-5. Sulfite destroys far more mutagens at higher temperatures than at lower ones, as is predicted by the chemistry.

The amount of time for reaction between sulfite and drinking water mutagens was ½ to 4½ hours in these experiments. Extended reaction times would be of no benefit unless large excesses or multiple additions of sulfite are used, because the sulfite is slowly oxidized and destroyed by dissolved air (oxygen). The availability of only very short contact times in sulfite treatment could be offset by use of large excesses of sulfite, as is predicted by the chemistry.

As a chemical reaction, the destruction of direct acting mutagens by sulfite depends on concentration, temperature and time. Adverse conditions of time and temperature may be offset by increased sulfite concentration. Optimal conditions will require lower sulfite concentrations. In all cases, however, a significant excess of sulfite over chlorine must be used.

EXAMPLE 7

This example is similar to the previous except monochloramine was used as the initial disinfectant instead of free chlorine. The final residual of monochloramine was 4.2 ppm as $Cl_2$, the temperature was 11° C. and the pH was 7.8. The stoichiometry of added sulfite to chlorine was 1.9×, yielding excess sulfite which could destroy an additional 3.8 ppm of chlorine. After 4 hours, filtration and rechlorination were performed exactly as with the above samples. The sulfite treated sample contained 35% of the mutagenic activity of a parallel sample not treated with sulfite; thus the procedure works with a different initial disinfectant, namely monochloramine.

EXAMPLES 8-10

Several finished water samples containing monochloramine were treated with sulfite and in each case the mutagenic activity, recovered by XAD adsorption and tested in the Ames test as above, was compared with that of a parallel sample that was not treated with sulfite. The temperature for these examples was room temperature (20°-25° C.) and the sulfite reaction time for each sample was 15 minutes to 20 hrs, reflecting the time taken to connect the water to the XAD column and pass the full volume through. The details are given in Table IV. Example 10 differs from the usual procedure in that mutagen recovery by XAD adsorption occurred at pH 2 instead of pH 7-9.

TABLE IV

| Example | Residual chlorine (ppm) | Molar ratio sulfite/ chlorine | Excess sulfite* | pH | Mutagen content (revertants/liter) | | % |
|---|---|---|---|---|---|---|---|
| | | | | | Sulfite treated | Not sulfite treated | |
| 8 | 3.5 | 1.2x | 0.7 | 7.4 | 119 | 316 | 38 |
| 9 | 3.0 | 1.8x | 2.4 | 7.4 | 79 | 372 | 21 |
| 10 | 2.3 | 1.6x | 1.4 | 8.0 | 302 | 921 | 33 |

*as additional ppm of Cl₂ which could be destroyed by the excess sulfite

These samples represent water taken from a tap, treated with sulfite at room temperature, and not chlorinated further. They could represent situations such as home treatment, where further chlorination is not required. Mutagen destruction occurs readily.

EXAMPLE 11-16

Samples of raw upper Mississippi River water were chlorinated with 7-10 ppm free chlorine at pH 7.4 and 20° C. for 16 hrs. Part of the chlorinated volume was treated with sulfite and subject to XAD adsorption. The other part was treated with ammonia to convert the chlorine to monochloramine, suppressing further mutagen formation; it too was subject to XAD adsorption. Both samples were assayed in the Ames test. Table V illustrates the procedures and results.

TABLE V

| Example | Added Cl₂ (ppm) | Residual chlorine (ppm) | Molar ratio sulfite/ chlorine | Excess sulfite* | Mutagen content revertants/liter | | % |
|---|---|---|---|---|---|---|---|
| | | | | | Sulfite treated | Not Sulfite treated | |
| 11 | 10 | 3.4 | 1.2 | 0.7 | 481 | 2266 | 21 |
| 12 | 10 | 3.6 | 1.4 | 1.4 | 159 | 917 | 17 |
| 13 | 8 | 2.9 | 2.5 | 1.5 | 289 | 1072 | 28 |
| 14 | 8 | 3.1 | 2.5 | 1.6 | 324 | 1298 | 25 |
| 15 | 7 | 2.2 | 1.3 | 0.7 | 363 | 780 | 47 |
| 16 | 7 | 2.2 | 1.1 | 0.2 | 272 | 874 | 31 |

*as additional ppm of Cl₂ which could be destroyed by the excess sulfite

These examples illustrate higher level chlorination and higher organic contents than one would find in drinking water. As a result of this, the values for mutagen content are far higher than one finds in finished drinking water made from the same raw river water at the same time of year. These examples would be relevant to instances of raw water chlorination as the first step in drinking water treatment and perhaps also to waste water treatment.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. The method of reducing the activity of non-volatile mutagens in chlorinated water, which method comprises:
   (A) determining the residual chlorine in the water,
   (B) adding sulfite to the water in amount in excess of that sufficient to eliminate the residual chlorine,
   (C) uniformly and thoroughly admixing said sulfite and water to dechlorinate the water and at least partially destroy the mutagens therein.

2. The method of claim 1 wherein said water is chlorinated drinking water.

3. The method of claim 1 wherein said water is chlorinated municipal or industrial effluent.

4. The method of claim 1 wherein said sulfite is added in the form of a soluble sulfite salt.

5. The method of claim 4 wherein said salt is selected from the group consisting of sodium sulfite and sodium bisulfite.

6. The method of claim 1 wherein said sulfite is added in the form of gaseous sulfur dioxide.

7. The method of claim 1 wherein said sulfite is added in amount about 1.5 to 10 times the stoichiometric ratio of sulfite to chlorine.

8. The method of claim 1 wherein said sulfite is added at from about 1.5 times the molarity of the chlorine residual up to about $2 \times 10^{-4}$ M.

9. The method of claim 1 wherein said sulfite treatment is carried out over about 15 minutes to 6 hours.

10. The method of claim 1 wherein the sulfite treatment is carried out at about 0° to 30° C.

11. The method of claim 1 wherein the sulfite treatment is carried out at about pH 5 to pH 12.

12. The method of claim 1 wherein the chlorinated water is drinking water and the dechlorinated drinking water is rechlorinated before distribution.

13. The method of claim 12 wherein the dechlorinated drinking water is rechlorinated by the addition of chloramine to establish a chloramine residual of greater than about 2 ppm.

14. The method of claim 12 wherein the dechlorinated drinking water is rechlorinated by the addition of chlorine to establish a free chlorine residual of greater than 0.1 ppm.

15. The method of reducing the activity of non-volatile direct-acting mutagens in chlorinated water, which method comprises:
   (A) determining the residual chlorine in the water,
   (B) adding sulfite to the water in the form selected from the group consisting of water soluble alkali metal sulfite and bisulfite and gaseous sulfur dioxide and in amount in excess of that sufficient to eliminate the residual chlorine of about 1.5 to 10 times the stoichiometric ratio of sulfite to chlorine,
   (C) uniformly and thoroughly admixing said sulfite and water at a temperature between about 0° to 30° C. at pH between 5 and 12 for about 15 minutes to 6 hours sufficient to dechlorinate the water and at least partially destroy the mutagens therein.

16. The method of claim 15 wherein the chlorinated water is drinking water and the dechlorinated water is rechlorinated before distribution by the addition of chloramine to establish a chloramine residual of about 2 to 4 ppm.

17. The method of claim 15 wherein the chlorinated water is drinking water and the dechlorinated water is rechlorinated before distribution by the addition of chlorine to establish a free chlorine residual of about 0.1 to 2 ppm.

* * * * *